Patented Jan. 4, 1944

2,338,089

UNITED STATES PATENT OFFICE 2,338,089

ACTIVE CONTACT MASS

George R. Bond, Jr., Paulsboro, N. J., assignor to Houdry Process Corporation, Wilmington, Del., a corporation of Delaware No Drawing. Application April 10, 1940,
Serial No. 328,896

11 Claims. (Cl. 252—254)

The present invention relates to contact masses useful in promoting, entering into or in any way assisting reactions. More particularly, it deals with adsorptive porous materials comprising metals or compounds thereof having colloidal or gel structure and is especially concerned with methods for the preparation of such materials from reactant solutions.

Gel forming reactions often must be conducted under carefully controlled conditions to avoid formation of comparatively inactive and more or less crystalline precipitates. Prior methods for effecting such control have involved the use of very dilute solutions of the compound or compounds which react to yield the desired metal or oxide and the careful addition to such solutions of a suitable precipitating or coagulating agent. A high degree of skill was necessary for successful use of these methods. If the reactant solutions were concentrated the reactions resulted in the rapid formation of more or less crystalline or other material of inferior value. The same undesired result was also obtained if the precipitating or coagulating agent was added too rapidly. For example, Kohlschutter (Z. Amorg. Chem. of 1934, pp. 220, 370) in preparing active chromium oxide gel from chromium salt solutions found it necessary, in order to avoid formation of an inferior product, to employ reactant solutions containing less than 0.1 mol of the salt per liter and to add the precipitating reagent, for example, ammonia, very slowly, even drop by drop, and over a considerable period of time. The product when formed was a flocculent precipitate which settled out of the mother liquor. In many instances, it has been extremely difficult, if not impossible, to produce from some starting materials products which have the desired gel characteristics.

From a commercial standpoint the disadvantages of the prior methods are obvious. They necessitated the use of cumbersome batch procedure. The gelatinous product when made contained such small quantities of the desired solid that in order to obtain commercially significant quantities of it tremendous amounts of water had to be removed by expensive drying and/or filtering operations.

One object of the present invention is to prepare contact masses having the porous structure and other desired characteristics of gels. Another object is to obtain such products from concentrated solutions. Another object is to prepare in gelatinous form materials which heretofore could be obtained as gels only with great difficulty, if at all. Another object is to yield a gelatinous product which is firm and continuous and which occupies all or substantially all the volume of the reactants, as distinguished from flocculent or other precipitates which settle in the mother liquor. Another object is to avoid the necessity of a high degree of skill for the production of the desired gelatinous product and to obtain the same with an easily controlled process. Another object is to effect the above objects by a simplified process adapted to continuous flow methods. Other objects will be apparent from the detailed description which follows.

According to the invention a metal salt or other metal compound which will react with a precipitating or coagulating agent to produce a gel or gelatinous precipitate comprising an oxide of said metal is mixed with an organic compound which is substantially unreactive with respect to the metal compound but which decomposes within the mixture to release a volatile or decomposable organic compound and a reactive precipitating or coagulating compound. The decomposable addition compound is one which is subject to sufficiently slow or delayed decomposition under the conditions of the mixture to permit thorough admixture before substantial quantity of active precipitant or coagulant is released. Release of the reactive or precipitating agent, for example, an acidic or basic compound, may take place as the result of decomposition processes initiated at the temperature obtaining at the time of mixture and progressing sufficiently slowly to permit the desired thorough admixture of the addition agent and metal compound before a substantial quantity of precipitant is released. In some instances, it is desirable to control the rate of decomposition by effecting the mixture at temperature sufficiently low to substantially avoid decomposition and subsequently to raise the temperature of the mixture to initiate and/or accelerate the desired decomposition. Conversely, the mixture may be cooled to retard the decomposition processes in the event they are proceeding too rapidly. Decomposition of the unreactive compound effects dissemination of the coagulant at controlled and preferably low rate and in highly dispersed form within and throughout the mixture whereby it promotes production of gelatinous or jelly-like colloidal products to the exclusion or substantially so of inferior solids.

One type of added unreactive addition agent includes unstable and substantially un-ionizable organic compounds which upon decomposition yield a coagulating agent or compound of acidic or alkaline nature or capable of ionization or hydrolysis to yield such an agent. The unreactive compound employed is by preference one which releases, in addition to the reactive precipitant, an oxygen containing organic compound vaporizable at or below drying temperature, for example, an alcohol, an aldehyde or a ketone.

When the desired coagulant is alkaline in character, as is often the case in forming gels comprising or containing chromium oxide, titanium oxide, zirconia, molybdenum oxide or berylia, for example, the un-ionizable compound may release, preferably slowly, a suitable cation which may be an alkali metal, but which preferably is volatile or decomposable, as for example, ammonium or an amine. When both the inert decomposition product and coagulating agent are volatile, excellent un-ionizable addition agents are found in the reaction products of aldehydes, for example, formaldehyde or acetaldehyde, with ammonia or an amine. Specific compounds of this type which have been found to yield highly active gels from a number of metal compounds include hexamethylene tetramine, (commonly known as formaldehyde-ammonia) and the reaction products of ethylene diamine, pyridine, dimethyl amine or quinoline with formaldehyde. These compounds often decompose within the mixture at ordinary temperature but at such low rate as to obtain the desired uniformity and gelatinous structure. The formaldehyde or other volatile substance released during the decomposition processes escapes from the gel during its formation and/or during subsequent drying, which preferably is conducted at comparatively low temperature, as for example, below 400° F. and preferably within the range of 200 to 400° F. The escape of the volatile material tends to increase the porosity and decrease the density of the resulting gel.

When it is desired to form acidic gels, for example, single or plural component gels comprising or containing tungstic acid, stannic acid or silicic acid, the desired reaction may be brought about by compounds or complexes capable of releasing at desired restricted rate a suitable acid reacting coagulant. Such a compound may be in the form of esters or other substantially unionizable compounds of organic or inorganic acids which are capable of releasing the selected acid substance within the reaction mixture. Typical compounds include methyl or ethyl oxalate, formate or borate, oxamide and aromatic or acyl sulphonates.

In the interests of economy and in order to obtain short setting or gelling times the alkalinity or acidity of the solution of the metal compound may be adjusted to approximately the value desired for the actual gel formation before the unreactive organic compound is added thereto as by including in or adding to the solution a suitable quantity of acid or alkali.

Controlled release of the coagulant leads to the formation of highly advantageous and continuous all-embracing gel structure independently of the concentration or chemical nature of solutions containing the desired metal or metal compound. Production of substantial quantities of less desirable precipitates is avoided even when these solutions are saturated or substantially so at the temperatures employed for the gelling reactions. Moreover, no particular care need be taken in the addition or mixing step. Thus, if batch operation is desired a suitable quantity of liquid containing the unreactive organic compound may be simply dumped into a metal salt solution, for example, while subjecting the latter solution to stirring or other agitation to effect reasonably rapid mixture. In the production of the gels in commercial quantities, however, it is preferable that the process be continuous. To this end, a continuous stream of metal salt solution may be co-mingled in suitable proportionate quantities with a continuous stream of the selected addition agent in any known or desired manner, as for example, after the manner disclosed in the copending application of Albert G. Peterkin and Hubert A. Shabaker, Serial No. 195,988, filed March 15, 1938 and issued February 25, 1941, as Patent No. 2,232,727.

After its formation, the gel may be subjected to any known or desired treatment, for example drying, washing, extraction of any of its components or modification of its composition by the action of acid, alkalies or salts, or heat treatment to regulate its content of water of hydration and to adjust its adsorptivity, activity or reactivity in accordance with its contemplated use.

The products obtained by practice of the invention exhibit all the characteristics of gels. In the freshly precipitated or wet state they are continuous, stiff, somewhat elastic jellies occupying substantially all the volume of the reaction mixture. Upon washing and drying these jellies form hard vitreous homogeneous lumps having high adsorptive capacities which are subject to marked decrepitation upon immersion in water. The true colloidal character of these products is demonstrated by the fact that when the jellies are washed free or substantially so of electrolytes and then heated in the wet state they revert to clear fluid sol condition, the sols often containing a higher quantity of metal or metal oxide components than could be obtained in saturated solutions of soluble salts of the same metal or oxide. In some instances, sols of such high concentration can be prepared that upon impregnating a porous solid they are converted to layers of stiff homogeneous gel through extraction of small quantities of water by the solid. Thus, there is formed from a small quantity of active material a contact mass presenting enormous areas of active surface and made up of the active material distributed within and throughout a support, promoter, diluent or other porous solid. For example, sols of substantially pure $Cr_2O_3$ containing at least 130 grams per liter of this water insoluble oxide (ignited or anhydrous basis) can easily be obtained from chromic oxide gel prepared according to the invention and washed substantially free of electrolytes. By evaporation, the $Cr_2O_3$ content of the sol can easily be increased to about 280 grams per liter when further evaporation results in a highly concentrated stiff and active gel. A suitable absorbent or adsorptive porous support, for example, kaolin or other clay or dried silicious or other gel dipped in or washed by the sol results in a contact mass containing controlled amounts of the desired and substantially pure catalytic substance distributed on the surfaces of the support. When each liter of the sol contains 190 to 200 grams or more $Cr_2O_3$ it deposits layers of gel on the surfaces of adsorptive solids immersed in it. No further washing or other purification of contact masses so prepared is necessary, in contra-distinction to masses made by dipping supports in decomposable salts and heating or otherwise treating the dipped solid to effect decomposition of the salt and deposition of the desired material on the supporting surfaces. Upon drying of the impregnated solid a product comprising an intimately associated blend of the supporting solid and an active vitreous product is produced.

The invention in its practice is not limited to the production of single gels (gels containing but a single metal or oxide) but on the contrary includes simultaneous formation of two or more gelatinous components, one of which may have specific activity in promoting a certain type of reaction, for example, dehydration, splitting, alkylation, polymerization, hydrogenation or dehydrogenation, while another may act as a stabilizer, promoter or diluent for the active component. Thus, a large and practically unlimited number of combinations will suggest themselves to persons skilled in the art. For example, in the production of contact masses intended for use in hydrogenating or dehydrogenating hydrocarbons and their derivatives and containing chromium oxide, molybdenum oxide, or both, these oxides may be formed in active gelatinous condition simultaneously with controlled quantities of alumina, silica, or both of these substances. Also, contact masses containing zirconium, beryllium, nickel, copper, iron, cobalt, vanadium or manganese in precipitated or gelatinous form and in combination with one or more active gels may result from a single coagulating or gelling operation.

The following examples give concrete illustrations of the invention and its practice.

Example 1

Approximately 5 volumes of about 2.5 molar solution of chromium nitrate was partially neutralized by slow addition thereto of about 4½ volumes of 12% ammonia solution. To the resulting clear, deep green solution about 1½ volumes of a water solution of hexamethylene tetramine containing of the order of 375 grams of hexamethylene tetramine per liter was added with stirring. The reaction mixture was then warmed to approximately 122° F. Immediately after the addition of the hexamethylene tetramine and during warming, there was a slow evolution of formaldehyde and within 5 to 10 minutes the entire reaction mixture set to a firm all embracing gel which contained about 90 grams per liter of $Cr_2O_3$. After washing this gel substantially free of nitrates and drying it at about 200° F., a dark green, vitreous, glassy product was obtained which was an active catalyst for promoting hydrogenation and dehydrogenation reactions in hydrocarbons and their derivatives. For this purpose the gel was preferably reduced at temperatures of at least 600° F. before use. The gel was also active in promoting dehydration reactions, for example, in alcohols.

Substantially pure $Cr_2O_3$ gels of high activity were likewise obtained according to the above method by using as starting materials saturated solutions of chromium sulphate or chromium chloride.

Similarly, from saturated salt solutions, equivalent gels were obtained when using as reagents water solutions of desired strength of reaction products of formaldehyde and ethylene diamine, formaldehyde and pyridine, and formaldehyde and dimethylamine.

Upon dialysis of the wet, stiff $Cr_2O_3$ gels with distilled water until they were substantially free of electrolytes and heating of the resulting purified product consisting practically entirely of amorphous $Cr_2O_3$ and water at about 150° F. the gels revert to stable fluid sols which upon slow evaporation yield a highly concentrated sol containing 200 grams per liter or more of $Cr_2O_3$. These sols remain fluid and do not revert to the stiff gelatinous form even after standing for several days or weeks.

Example 2

Approximately 1½ volumes of 12% ammonia solution was added to about 2½ volumes of a solution of zirconium sulphate containing of the order of 133 grams of $ZrO_2$ per liter to partially neutralize the solution. The resulting clear colorless solution was mixed with about 2.4 volumes of hexamethylene tetramine of substantially the same strength as set forth in Example 1. Upon warming, the whole mix set to a firm white gel which, after drying and washing substantially free of sulphates, yielded hard clear lumps of a glass-like solid having high adsorptivity. This material, when combined with or supported by an inert or other suitable porous solid, for example, silica gel, alumina, clays, or the like, was active in promoting polymerization of olefines and other unsaturated hydrocarbons to yield anti-knock motor fuels, and/or higher molecular products.

Example 3

Approximately one volume of pure $TiCl_4$ was diluted with about 2½ volumes of water and to the resulting solution was slowly added, with agitation, about 1.6 volumes of 12% ammonia. The partially neutralized titanium chloride solution was then mixed with about 3½ volumes of hexamethylene tetramine solution of substantially the same strength as set forth in Example 1. On standing over night at room temperature the entire reaction mixture set to a firm brownish translucent gel consisting essentially of titanium oxide. Upon washing and drying, this gel yielded a hard, translucent, glass-like fragmentary solid capable of promoting dehydrogenation of hydrocarbons and other reactions.

Example 4

A mixed gel containing coprecipitated $Cr_2O_3$ and $MoO_3$ was made by mixing about 1.5 volumes of hexamethylene tetramine solution of substantially the same strength as utilized in the foregoing examples with approximately 16 volumes of a solution of chromium nitrate and ammonium molybdate containing about 87 grams per liter of $Cr_2O_3$ and of the order of 98 grams per liter of $MoO_3$. Within a few seconds the whole mass thickened to a gel which, upon drying and washing, yielded a dark green mass having vitreous fracture. This mass, when normal heptane was passed over it at about 900° F., yielded a liquid product containing of the order of 61% aromatics together with a gas consisting predominately of hydrogen.

In some instances and with some combinations of coagulant and metal compounds there may be formed as products of side reactions a small quantity of non-gelatinous precipitates, for example, simple or complex basic or acidic salts or hydrates, or temporarily insoluble compounds of the coagulant or the inert decomposition product with the metal or metal compound in the reaction mixture. In most cases the by-product thus formed is temporary in character and readily returns into solution before the gel-forming reactions are well under way, or at least before they are completed. In any case, the amount of such products is small, and, by virtue of the restricted rate of release of the coagulant in active form within and throughout the reaction mixture, the desired gel formation proceeds independently of the side reactions to yield a product consisting substantially entirely of active gel. Thus, an active product in gelatinous form or condition is obtained in practice of the invention in spite of any formation of less valuable products. The latter, even if permanent, when they are formed, occur in such small quantities as to have little if any effect on the value of the final product. Any tendency of the coagulant or of the volatile organic decomposition product to form crystalline or other undesired products may be restricted or eliminated by conducting the mixing step in the cold and then heating the mixture to obtain controlled gel forming reactions.

I claim as my invention:

1. In the production of oxide gels by interaction of a compound of a metal and a precipitating agent the process of mixing said metal compound with an organic compound substantially unreactive with respect to said metal compound and slowly decomposable within the mixture to produce a reactive precipitating compound and a volatile organic product, effecting the mixture under conditions including temperature which maintain said unreactive organic compound in substantially undecomposed condition until mixture is complete, and employing conditions in the completed mixture which effect slow decomposition of the unreactive compound and release of the coagulating compound within and throughout the mixture to promote uniform gel forming reactions.

2. In the preparation of oxide gels the process comprising mixing a compound of a metal with an organic compound substantially unreactive with respect to said metal compound and which decomposes without ionization within the resulting mixture to produce a compound which in solution ionizes to form a precipitant whereby to produce a gelatinous metal oxide and which organic compound decomposes to produce a second compound which is inert and un-ionizable within the mixture, effecting said mixture at a temperature at which said substantially unreactive compound is substantially undecomposed, and raising the temperature of the resulting mixture to decompose said compound and produce the gel-forming reactions.

3. The process defined in claim 1 in which said compound which ionizes in solution and which is formed by decomposition of said organic compound, ionizes to form an acidic solution.

4. The process defined in claim 2 in which said compound which ionizes in solution and which is formed by decomposition of said organic compound, ionizes to form an acidic solution.

5. In the preparation by wet methods of contact masses having the pore structure and other properties of gels, the steps comprising mixing with a metal compound capable of reacting to form a coagulum containing an oxide of said metal a substantially un-ionizable compound which is decomposable within the mixture to produce a volatile organic compound and a reactive coagulating compound capable of promoting formation of said metal oxide, and subjecting the mixture to temperature sufficiently high to effect decomposition of said decomposable compound with simultaneous release of said precipitating compound and volatilization of said organic compound.

6. In the production of metal oxide gel, the process of mixing with a solution of metal compound which will react with a coagulant to form the desired gel a substantially un-ionizable organic compound decomposable within the mixture to produce a volatile organic compound and a reactive coagulating compound, employing temperature sufficiently low during mixing to permit thorough admixture of said solution and said decomposable compound while maintaining the latter in substantially undecomposed condition and sufficiently high after mixture is complete to effect decomposition of said decomposable compound with resulting formation of a uniform gel throughout the entire mix.

7. In the preparation by wet methods of contact masses having the pore structure and other properties of gels, the step comprising mixing with a metal compound which will react to form an alkaline coagulum containing an oxide of said metal a substantially un-ionizable decomposable reaction product of an alkaline coagulating compound and a volatile organic compound, which reaction product decomposes within the mixture slowly to release said alkaline compound therein to form a gelatinous coagulum.

8. In the preparation of contact masses having the pore structure and other properties of gels, the step comprising mixing with a concentrated solution of metal compound capable of reacting to form an alkaline coagulum containing an oxide of said metal a compound incapable of promoting said reaction which decomposes within the mixture slowly to produce therein a volatile organic compound and an alkaline cation selected from the group consisting of ammonium and amino cations to promote formation of uniform gel occupying substantially the entire volume of said mix.

9. In preparing active gels the process of mixing with a concentrated solution of metal salt a substantially un-ionizable organic compound decomposable within the mixture to produce a coagulating agent selected from the group consisting of ammonium and amino cations and a volatile organic compound selected from the group consisting of alcohols and aldehydes, and subjecting the mixture to temperature which effects said decomposition to release said coagulating agent and said volatile organic compound therein, whereby gel formation proceeds uniformly and at the same time within substantially the entire mixture, and releasing the volatile organic compound from the mixture as a gas.

10. In preparing active gels comprising an oxide of a metal selected from the group consisting of chromium, titanium, molybdenum, zirconium and beryllium, the steps comprising mixing a solution of a salt of at least one of said metals with hexamethylene tetramine, controlling the temperature of the mixture in such a manner as to effect slow decomposition of the hexamethylene tetramine to ammonia and formaldehyde whereby formation of the gel is effected, and permitting the formaldehyde to escape.

11. In the production of oxide gels by interaction of a compound of a metal and a precipitating agent the process of mixing a compound of a metal selected from the group consisting of Cr, Ti, Zr, Mo, Be, W, Sn and Si, with an organic compound substantially unreactive with respect to said metal compound and slowly decomposable within the mixture to produce a volatile organic compound and a compound which reacts with said metal compound to yield a gelatinous oxide of said metal, effecting the mixture under conditions including temperature which maintain said unreactive organic compound in substantially undecomposed condition, subjecting the mixture to conditions including temperature which effect decomposition of the unreactive compound in the mixture to release the aforesaid reactive compound to effect uniform gel forming reactions within and throughout the mixture, and subjecting the product of the gel forming reactions to temperature conditions which drive off said volatile organic product.

GEORGE R. BOND, Jr.